United States Patent [19]

Bean

[11] Patent Number: 4,473,968
[45] Date of Patent: Oct. 2, 1984

[54] PREDATOR CONTROL DEVICE
[76] Inventor: Jerry R. Bean, Harper Rte. Box 2B, Fredericksburg, Tex. 78624
[21] Appl. No.: 478,833
[22] Filed: Mar. 25, 1983
[51] Int. Cl.³ .................. A01M 25/00; A01M 27/00
[52] U.S. Cl. ................................................ 43/131
[58] Field of Search .................... 43/84, 124, 131; 42/1 TB; 124/65, 66

[56] References Cited

U.S. PATENT DOCUMENTS

| | | | |
|---|---|---|---|
| 2,059,127 | 10/1936 | Marlman | 43/84 |
| 2,145,488 | 1/1939 | Marlman | 43/84 |
| 2,301,764 | 10/1942 | Wainwright | 43/84 |
| 2,338,418 | 1/1944 | Cootes | 43/84 |
| 2,353,798 | 7/1944 | Wainwright | 43/84 |
| 2,377,658 | 6/1945 | Winersteen | 43/84 |
| 2,456,957 | 11/1948 | Koch | 43/84 |
| 2,480,593 | 3/1949 | Moen | 43/84 |
| 2,512,252 | 6/1950 | Lehn | 43/84 |
| 2,515,447 | 9/1950 | Graybill | 43/84 |
| 2,575,515 | 4/1951 | Graybill | 43/84 |
| 2,654,178 | 10/1953 | Graybill | 43/84 |
| 3,340,645 | 9/1967 | Poteet | 43/131 |
| 3,391,483 | 7/1968 | Marlman | 43/84 |
| 3,945,341 | 4/1976 | Jackson | 43/84 |

Primary Examiner—Nicholas P. Godici
Assistant Examiner—M. Jordan
Attorney, Agent, or Firm—John R. Kirk, Jr.

[57] ABSTRACT

A trigger actuated device to expel a poison into the mouth of a predatory animal in response to the predatory animal attempting to remove bait from the trigger mechanism. The poison is expelled from a barrel by a pushrod driven by the detonation of a primer means such as a percussion cap or cased ammunition primer.

4 Claims, 6 Drawing Figures

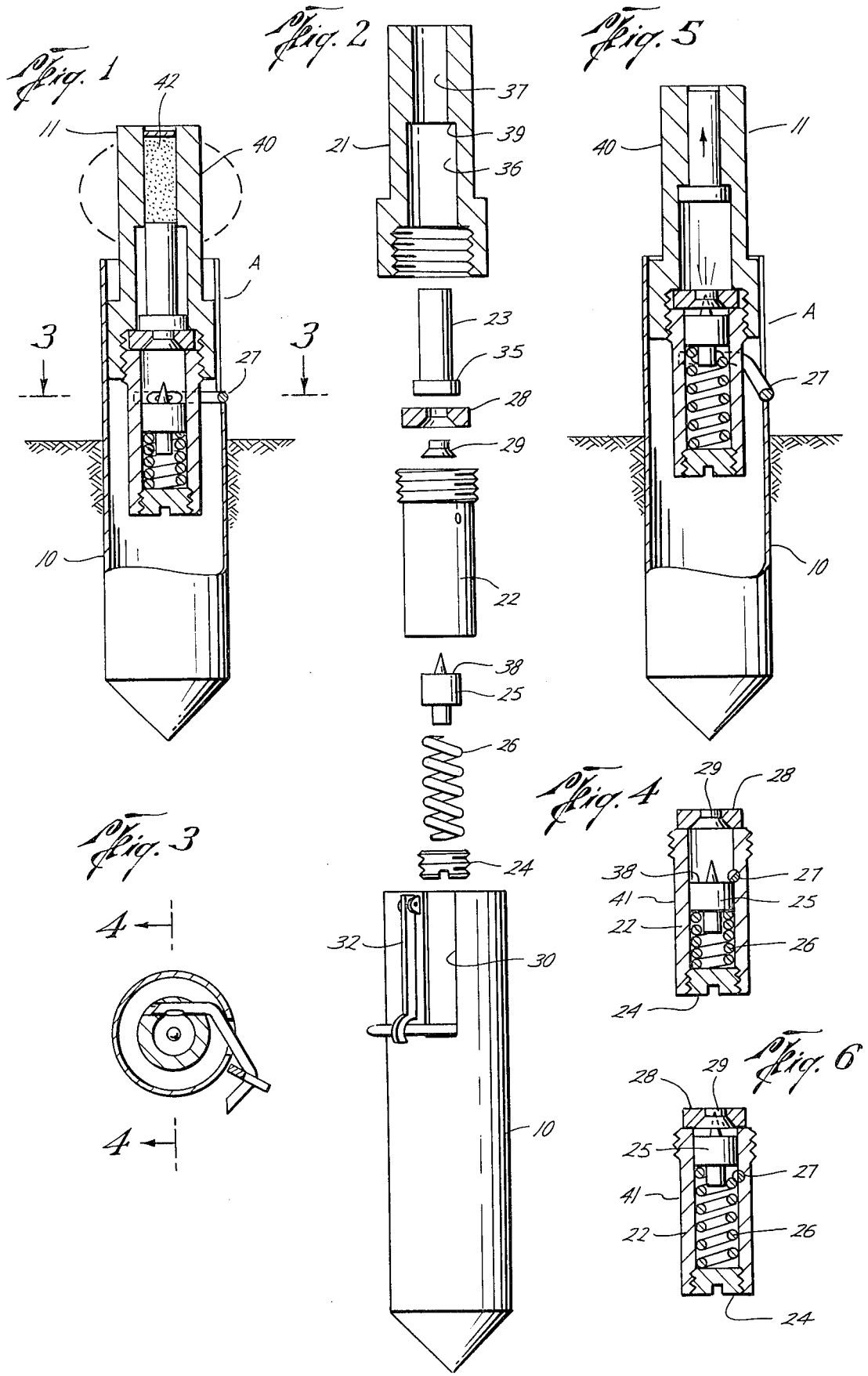

PREDATOR CONTROL DEVICE

Background of the Invention

1. Field of the Invention

The present invention relates to a device to expel a poison into the mouth of a predatory animal for the control of such animal.

2. Description of the Prior Art

The control of predatory animals in an efficient and humane manner is of great importance to owners of livestock. Of particular interest is the control of coyotes in areas where sheep are raised. Typically in the prior art a device is buried leaving a barrel or trigger exposed which is covered with bait or a scented material to attract the coyote. When the coyote attempts to pick up the bait a poison, such a cyanide, is propelled into the coyote's mouth. Prior art devices of this type are described in U.S. Pat. No. 3,340,645 issued to J. L. Poteet, U.S. Pat. No. 2,059,127 issued to E. J. Marlman and U.S. Pat. No. 3,945,341 issued to G. R. Jackson. Devices disclosed in the prior art have relied upon either an explosive powder and wadding or a spring driven plunger to drive the poison into the mouth of the predator. Such prior art devices of the explosive type have been unsatisfactory in practice due to the dangers in handling a loaded device which discharges not only the poison but the wadding with considerable force. Devices relying on spring propulsion alone do not always reliably penetrate the chamber and expel the poison; this is particularly true when these devices, which are made of unlike metal parts, have been exposed to the corrosive effects of weathering.

Summary of the Invention

The present invention provides a new and improved predatory control device which is reliable and safe under adverse conditions. In practice such devices are exposed to extremes in weather and in handling so that reliability, safety and ease of handling are important. The device of the present invention is more reliable than a spring driven device but is safer than the prior art explosive devices in that the force used to expel the poison from the device is limited to only that necessary to propel such poison the short distance into the mouth of the predatory animal. The poison is expelled from the device by a pushrod so that only the poison is expelled. The explosive force used is limited to that of a primer means such as a nipple mounted percussion cap or a primer for cased ammunition. No wadding is expelled with the poison so that the device is less likely to harm a handler upon accidental discharge. There is a minimal explosive sound to warn other nearby predatory animals when the device is triggered.

The present device comprises an anchor means, preferably a tipped tube, to retain the device to the ground and a combined breech and chamber element which fits therein or is attached thereto. In response to an upward pull a trip holder activates a trigger wire which releases a spring biased firing pin. The firing pin detonates a primer means which drives a rimmed pushrod into a choked barrel to expel a poison from the barrel.

Brief Description of the Drawings

FIG. 1 is a cross-sectional side view of the present invention in a cocked configuration.

FIG. 2 is an exploded side view of the present invention.

FIG. 3 is a cross-sectional view of the present invention along line 3—3 of FIG. 1.

FIG. 4 is a cross-sectional side view of the chamber of the present invention in a cocked position.

FIG. 5 is a cross-sectional side view of the present invention in its fired configuration.

FIG. 6 is a cross-sectional side view of the chamber of the present invention in its fired position.

Description of the Preferred Embodiment

The apparatus A consists of anchor body 10 and an breech assembly 11 capable of fitting therein. The breech assembly consists of a barrel assembly 21 and a chamber assembly 41 threadably mounted thereto. Said barrel assembly 21 is choked such that movement of the rimmed pushrod 23 contained therein is limited to that necessary to expel the poison 42 located in the barrel 21 by abutment of the pushrod rim 35 with the shoulder 39. The rimmed pushrod 23 is of such a length so as to extend the length of the unchoked portion 36 of the barrel 21 and extend partially into the choked portion 37 so as to act as a lower seal for the poison 42 within the choked portion of the barrel 37 and to guide the pushrod 23 into the choked portion of the barrel 37. The chamber assembly 41 consists of the chamber body 22 externally threaded at one end for attachment to the barrel body 21 and internally threaded at the other end for engagement of the retainer 24. Enclosed by the chamber body 22 is a rimmed firing pin 25 and a spring 26 to drive the firing pin 25. Extending tangentially through the chamber body 22 and partially intersecting the firing pin rim 38 is a notched trip wire 27. The trip wire 27 is notched so that as the trip wire 27 is rotated the notched portion of the trip wire is exposed to the firing pin rim 38 thereby releasing the firing pin 25. The firing pin 25 is biased in the chamber 22 by a spring 26. The spring compression is adjustable through the threaded retainer 24. Nested between the barrel body 21 and the chamber body 22 below the pushrod 23 is a washer 28 with a conical hole in the center to receive a primer 29 and which orients the primer 29 above the firing pin 25. Upon rotation of the trip wire 27 the spring biased firing pin 25 is released and detonates the primer 29. The force of the primer 29 drives the pushrod 23 upward into the unchoked portion of the barrel 37 discharging the poison 42 contained therein.

The trip wire 27 extends axially from the chamber body 22 and is formed radially about the anchor body 10 such that upward or downward motion at the exposed end of the trip wire 31 causes a rotation of the notched portion of the trip wire 27 within the chamber body 22. When the breech assembly 11 is fitted into the anchor body 10 the exposed end of the trip wire 31 engages a longitudinal slot 30 in the anchor body 10. The exposed end of the trip wire 31 is releasably attached to one end of the trip holder 32 which is mounted to the exterior of the anchor body 10 at its other end. When the exposed area of the barrel 40 is pulled upward by a predator taking the bait the trip holder 32 prevents upward movement of the exposed end of the trip wire 31. This upward movement of the exposed bowel 40 and the breech assembly 11 while the exposed end of the trip wire 31 is held stationary causes the rotation of the portion of the trip wire 27 within the chamber 22 releasing the spring biased firing pin 25, detonating the primer 29, driving the pushrod 23 into the barrel 37 and thereby expelling the poison 42 from the barrel 37 into the predator's mouth.

What is claimed is:

1. A predator control device comprising:
   an anchoring means;
   a breech assembly containing a choked barrel portion releasably secured to said anchoring means;
   a spring-biased firing pin in said breech assembly;
   a holding means secured within said breech assembly for holding a primer means in alignment with said firing pin;
   a rimmed pushrod in said breech assembly movably mounted in said choked barrel portion to bring said rim into abutment with a bottom end of said choked barrel portion whereby, when said pushrod is retracted a charge of poison may be inserted into said choked barrel portion; and
   a trigger extending from said breech assembly for cocking said firing pin and for releasing said firing pin in response to an upward pull to thereby fire said primer means to force said pushrod into said barrel and to expel said poison from said barrel.

2. A predator control device as in claim 1 wherein:
   said firing pin is a rimmed firing pin; and
   said trigger comprises a notched wire rotatably mounted in said breech assembly releasably engaged with said spring-biased rimmed firing pin.

3. A predator control device as in claim 1 wherein said anchoring means comprises a tipped tube that can be driven into the ground having a longitudinal slot to receive said trip wire and a trip holder mounted thereon whereby said trip holder can engage the end of said trip wire exposed by said slot.

4. A predator control device as in claim 1 wherein said primer means holding means comprises a washer nestable within said breech assembly having a central conical hole into which a primer can be inserted.

* * * * *